US012296262B2

(12) United States Patent
Shen

(10) Patent No.: US 12,296,262 B2
(45) Date of Patent: May 13, 2025

(54) VIRTUAL-ENVIRONMENT-BASED OBJECT CONSTRUCTION METHOD AND APPARATUS, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Chao Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/413,651

(22) Filed: Jan. 16, 2024

(65) Prior Publication Data

US 2024/0149161 A1 May 9, 2024

Related U.S. Application Data

(63) Continuation of application No. 17/334,667, filed on May 28, 2021, now Pat. No. 11,911,697, which is a
(Continued)

(30) Foreign Application Priority Data

Apr. 12, 2019 (CN) .......................... 201910292427.6

(51) Int. Cl.
*A63F 13/52* (2014.01)
*G06T 19/20* (2011.01)

(52) U.S. Cl.
CPC .............. *A63F 13/52* (2014.09); *G06T 19/20* (2013.01); *G06T 2200/24* (2013.01);
(Continued)

(58) Field of Classification Search
CPC ..... A63F 13/52; G06T 19/20; G06T 2200/24; G06T 2210/12; G06T 2219/2004; G06T 2219/2012
(Continued)

(56) References Cited

U.S. PATENT DOCUMENTS 8,458,188 B2 6/2013 Salemann
10,748,326 B2 * 8/2020 Caulfield ................ G06T 7/593
(Continued)

FOREIGN PATENT DOCUMENTS

CN 103325144 A 9/2013
CN 103679808 A 3/2014
(Continued)

OTHER PUBLICATIONS

The State Intellectual Property Office of the People's Republic of China (SIPO) Office Action 1 for for 201910292427.6, Apr. 6, 2021 9 Pages (including translation).
(Continued)

*Primary Examiner* — Allen Chan
(74) *Attorney, Agent, or Firm* — Anova Law Group, PLLC

(57) ABSTRACT

A virtual-environment-based object construction method is disclosed for a computer device. The method includes displaying an environment interface corresponding to a virtual environment, receiving a three-dimensional (3D) model input operation, the 3D model input operation being used for inputting a target 3D model of a target object, receiving a position input operation, the position input operation being used for determining a display position of the target object in the virtual environment, and displaying the target object at the display position according to the 3D model input operation and the position input operation, the
(Continued)

target object being obtained by filling with voxel blocks within a contour range of the target 3D model.

20 Claims, 14 Drawing Sheets

Related U.S. Application Data continuation of application No. PCT/CN2020/077410, filed on Mar. 2, 2020.

(52) U.S. Cl.
CPC .. *G06T 2210/12* (2013.01); *G06T 2219/2004* (2013.01); *G06T 2219/2012* (2013.01)

(58) Field of Classification Search
USPC .......................................................... 463/31
See application file for complete search history.

(56) References Cited

U.S. PATENT DOCUMENTS

| | | | |
|---|---|---|---|
| 11,024,085 B2 * | 6/2021 | Kim | G06F 3/017 |
| 2004/0070583 A1 | 4/2004 | Tsai et al. | |
| 2017/0221254 A1 | 8/2017 | Zar et al. | |
| 2018/0264365 A1 | 9/2018 | Soederberg et al. | |
| 2019/0138785 A1 | 5/2019 | Olsen et al. | |
| 2019/0240581 A1 | 8/2019 | Walker et al. | |

FOREIGN PATENT DOCUMENTS

| | | |
|---|---|---|
| CN | 108136257 A | 6/2018 |
| CN | 109364481 A | 2/2019 |
| CN | 109493417 A | 3/2019 |
| CN | 109562294 A | 4/2019 |
| CN | 110047152 A | 7/2019 |
| GB | 201707181 | 6/2017 |
| JP | 2002342785 A | 11/2002 |
| JP | 2011070387 A | 4/2011 |
| JP | 2011198135 A | 10/2011 |
| JP | 2017142788 A | 8/2017 |

OTHER PUBLICATIONS

Minecraft, "[Minecraft 0.15 around] Pixel Art Generator—Mo Zhi", Jan. 20, 2017 (Jan. 20, 2017), Retrieved from the Internet: URL: https://m.iqiyi.com/w_19ruc9dgwh.html. 2 pages.
The World Intellectual Property Organization (WIPO) International Search Report for PCT/CN2020/077410 Jun. 8, 2020 5 Pages (including translation).
The Japan Patent Office (JPO) Notification of Reasons for Refusal for Application No. 2021-528427 Jun. 20, 2022 7 pages (including translation).

* cited by examiner

VIRTUAL-ENVIRONMENT-BASED OBJECT CONSTRUCTION METHOD AND APPARATUS, COMPUTER DEVICE, AND COMPUTER-READABLE STORAGE MEDIUM

RELATED APPLICATION(S)

This application is a continuation of U.S. application Ser. No. 17/334,667 filed on May 28, 2021; U.S. application Ser. No. 17/334,667 is a continuation application of PCT Patent Application No. PCT/CN2020/077410, filed on Mar. 2, 2020, which claims priority to Chinese Patent Application No. 2019102924276, entitled "VIRTUAL-ENVIRONMENT-BASED OBJECT CONSTRUCTION METHOD AND APPARATUS, AND READABLE STORAGE MEDIUM", filed with the China National Intellectual Property Administration on Apr. 12, 2019, all of which are incorporated herein by reference in entirety.

FIELD OF THE TECHNOLOGY

Embodiments of the present disclosure relate to the field of virtual environment, and in particular, to a virtual-environment-based object construction method and apparatus, a computer device, and a computer-readable storage medium.

BACKGROUND

A sandbox game is a game mode in which a player uses voxel blocks provided in the game to create an original object and interacts with the original object. Optionally, voxel blocks provided in the sandbox game may be voxel blocks classified by material or voxel blocks classified by color. For example, the sandbox game provides coal voxel blocks, diamond voxel blocks, brick voxel blocks, and the like, or red voxel blocks, green voxel blocks, purple voxel blocks, and the like.

Generally, the player uses voxel blocks classified by color to construct colorful objects such as a decorative object and a billboard in a sandbox game environment. Taking the construction of a decorative object as an example, the player first determines an overall style of the decorative object to be built, then stacks voxel blocks of different colors at corresponding positions of the style according to the overall style, and obtains the decorative object after stacking.

SUMMARY

According to embodiments of the present disclosure, a virtual-environment-based object construction method and apparatus, a computer device, and a computer-readable storage medium are provided.

In one aspect, the present disclosure provides a virtual-environment-based object construction method, including: displaying an environment interface corresponding to a virtual environment; receiving a three-dimensional (3D) model input operation, the 3D model input operation being used for inputting a target 3D model of a target object; receiving a position input operation, the position input operation being used for determining a display position of the target object in the virtual environment; and displaying the target object at the display position in the virtual environment according to the 3D model input operation and the position input operation, the target object being obtained by filling with voxel blocks within a contour range of the target 3D model.

In another aspect, the present disclosure provides a virtual-environment-based object construction apparatus, including a memory storing computer program instructions; and a processor coupled to the memory and configured to execute the computer program instructions and perform: displaying an environment interface corresponding to a virtual environment; receiving a three-dimensional (3D) model input operation, the 3D model input operation being used for inputting a target 3D model of a target object; receiving a position input operation, the position input operation being used for determining a display position of the target object in the virtual environment; displaying the target object at the display position in the virtual environment according to the 3D model input operation and the position input operation, the target object being obtained by filling with voxel blocks within a contour range of the target 3D model.

In yet another embodiment, the present discloses a non-transitory computer-readable storage medium, storing at least one instruction, at least one program, a code set or an instruction set, the at least one instruction, the at least one program, the code set or the instruction set being loaded and executed by the processor to perform: displaying an environment interface corresponding to a virtual environment; receiving a three-dimensional (3D) model input operation, the 3D model input operation being used for inputting a target 3D model of a target object; receiving a position input operation, the position input operation being used for determining a display position of the target object in the virtual environment; and displaying the target object at the display position in the virtual environment according to the 3D model input operation and the position input operation, the target object being obtained by filling with voxel blocks within a contour range of the target 3D model.

A computer program product is provided, the computer program product, when running on a computer, causing the computer to perform the virtual-environment-based object construction method according to the embodiments of the present disclosure.

Details of one or more embodiments of the present disclosure are provided in the accompanying drawings and descriptions below. Other features and advantages of the present disclosure become obvious with reference to the specification, the accompanying drawings, and the claims.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

First, terms involved in certain embodiments of the present disclosure are briefly introduced:

Sandbox game: a game mode in which a player uses voxel blocks provided in the game to create an original object and interacts with the original object. In certain embodiments, the sandbox game is a game application that constructs a virtual object in a virtual environment with voxel blocks. Generally, the sandbox game is highly interactive and offers a high degree of freedom to the player, who can creatively construct and stack voxel blocks in the virtual environment of the game. In certain embodiments, no main storyline is set in the sandbox game usually, and the player walks freely in the virtual environment of the game without having to perform or complete corresponding tasks according to the development of the storyline.

Figure 1:
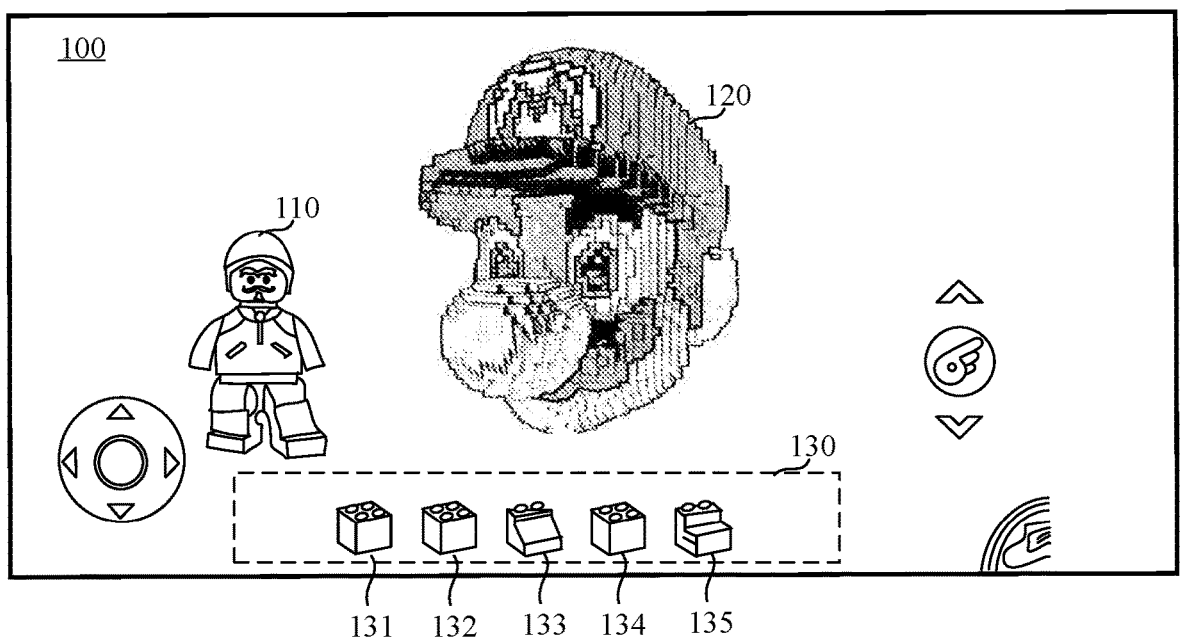
FIG. 1 is a schematic diagram of a virtual environment and voxel blocks of a sandbox game according to one or more embodiments of the present disclosure.

Voxel block: a material block provided in a sandbox game for constructing a virtual object in a virtual environment. In certain embodiments, voxel blocks may be classified by the material type, by color, or by both the material type and color. The three situations are separately illustrated as follows. 1. A sandbox game provides coal voxel blocks, diamond voxel blocks, brick voxel blocks, and the like; 2. A sandbox game provides red voxel blocks, green voxel blocks, purple voxel blocks, and the like; 3. A sandbox game provides red bricks, green bricks, purple bricks, and the like. In certain embodiments, voxel blocks classified by the material type can be processed into materials for a building, furniture, and other articles. For example, glass obtained by smelting sand voxel blocks can be used as a window of a building. In certain embodiments, objects with rich colors such as decorative objects and billboards may be constructed by using voxel blocks classified by color. In certain embodiments, the size of voxel blocks can be fixed. For voxel blocks classified by the material type, the size of the voxel blocks can be determined according to different material types. For voxel blocks classified by color, voxel blocks of any color may have the same size, and each color corresponds to voxel blocks of a plurality of sizes, for example, small-sized white voxel blocks, medium-sized white voxel blocks, and large-sized white voxel blocks. In certain embodiments, the shape of voxel blocks can be uniform, such as a cuboid or a cube, or may be in a plurality of styles. As shown in FIG. 1, an environment interface 100 includes an image corresponding to a virtual environment, the virtual environment includes a virtual character 110 and an object 120 built by a player, and the object 120 is built by using voxel blocks in a voxel library. Shapes of some voxel blocks in the voxel library are shown in a voxel block display region 130. The voxel block display region 130 includes a green square voxel block 131, a brown square voxel block 132, a brown triangular voxel block 133, a black square voxel block 134, and a gray step voxel block 135, and the voxel blocks are displayed in the shapes of Lego blocks.

In certain embodiments, the voxel blocks may be obtained by the player in a virtual environment, or provided by the application. For example, the coal voxel blocks, diamond voxel blocks, and the like may need to be obtained by the player through mining in a virtual environment, while ordinary voxel blocks classified by color are provided by the game.

Implementation scenarios of the virtual-environment-based object construction method provided in the embodiments of the present disclosure are described. The application scenarios of the virtual-environment-based object construction method provided in the present disclosure include at least the following application scenarios:

When constructing a target object in a sandbox game, the player uploads a 3D model in the virtual environment of the sandbox game and selects a display position of the target object corresponding to the 3D model. Then corresponding voxel blocks are automatically filled in a contour of the 3D model according to the 3D model, and the target object is generated and displayed at the display position.

In certain embodiments, in the foregoing example, the sandbox game is used as an example for description. The method is further applicable to any application that provides a virtual environment and voxel blocks, which is not limited in the embodiments of the present disclosure.

Figure 2:
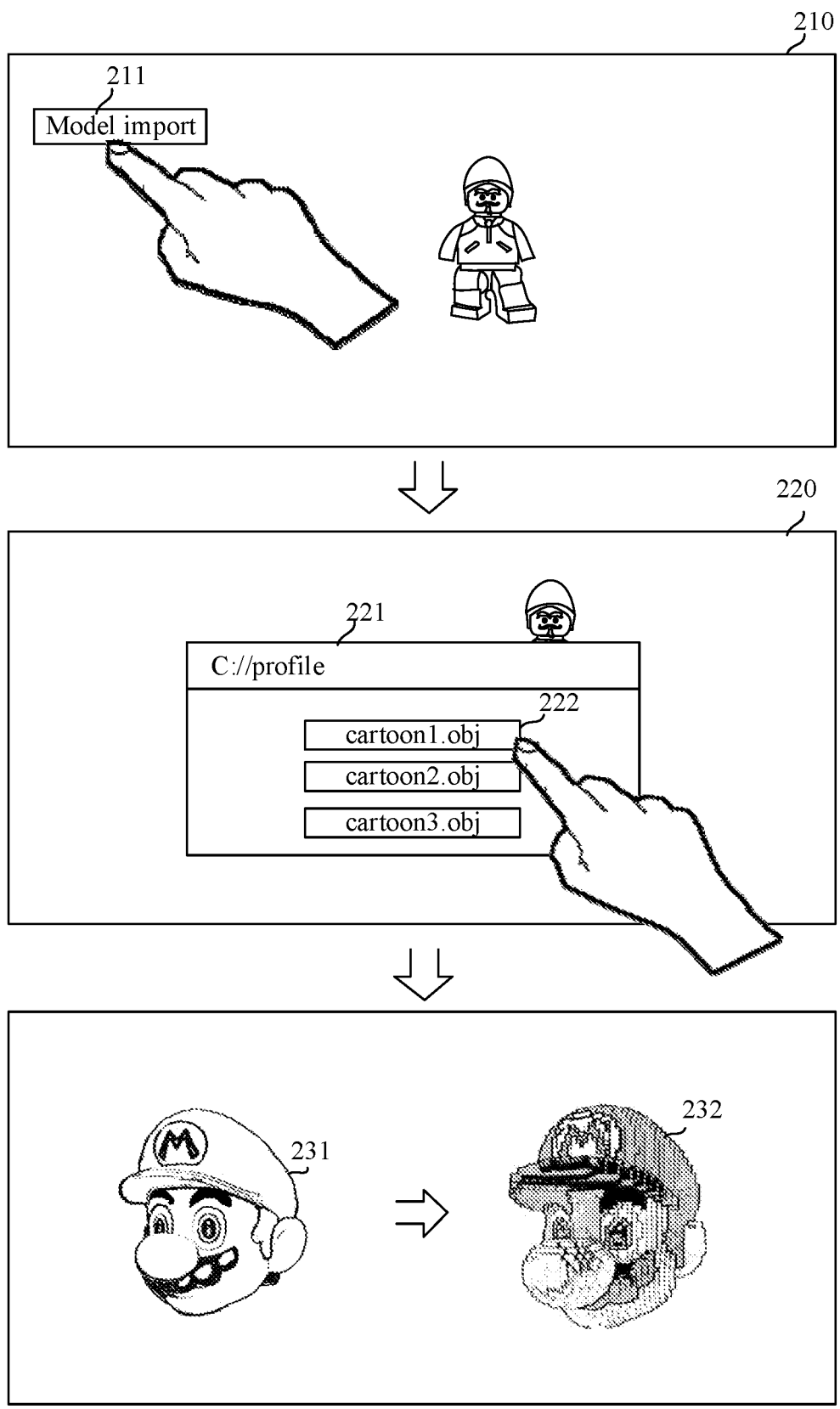
FIG. 2 is an overall schematic flowchart of a virtual-environment-based object construction method according to one or more embodiments of the present disclosure.

For example, referring to FIG. 2, an environment interface 210 includes a model import control 211. After a user selects the model import control 211, a model import interface 220 is displayed. The model import interface includes an importable model file list 221 stored in the terminal. After the user selects an importable model file 222, a target 3D model 231 corresponding to the importable model file 222 is imported, and voxel blocks are filled within a contour range of the target 3D model 231 according to the target 3D model 231 to obtain a target object 232. Then a display position of the target object 232 is determined by dragging the target object 232, to display the target object 232.

Figure 3:
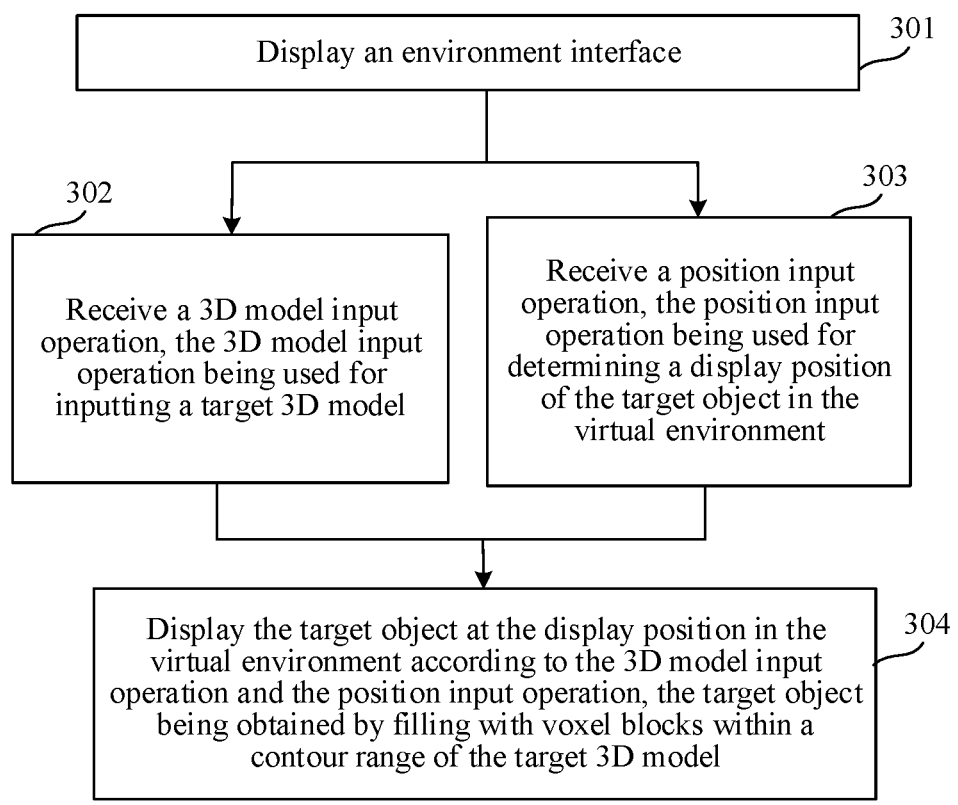
FIG. 3 is a flowchart of a virtual-environment-based object construction method according to one or more embodiments of the present disclosure.

With reference to the term introductions and application scenarios, the virtual-environment-based object construction method provided in an embodiment of the present disclosure is described. The method is applicable to a terminal, or may be implemented by a combination of a terminal and a server. As shown in FIG. 3, the method includes the following steps:

Step 301: Display an environment interface.

In certain embodiments, the environment interface includes an image corresponding to a virtual environment.

In certain embodiments, the method is applicable to a sandbox game. The sandbox game provides a virtual environment, and the virtual environment includes a virtual entity. The player can control the virtual entity to move in the virtual environment, construct voxel blocks, or perform other operations. In certain embodiments, currently available voxel blocks are also displayed in the environment interface.

Step 302: Receive a 3D model input operation, the 3D model input operation being used for inputting a target 3D model.

In certain embodiments, the target 3D model is used for determining a style of a to-be-constructed target object. In certain embodiments, the target 3D model is used for determining a contour of the target object. In certain embodiments, the voxel blocks filled within the contour range of the target 3D model may be voxel blocks of the same color, or corresponding voxel blocks may be filled according to the color of the appearance of the target 3D model, or the target object corresponding to the target 3D model may be filled with voxel blocks according to a set color filling rule.

In certain embodiments, a file corresponding to the target 3D model is a file in a 3D model file format. For example, the file is a file with a suffix of ".obj".

In certain embodiments, the implementation of the 3D model input operation includes at least one of the following methods:

In the first method, a model import interface is displayed, the model import interface including an importable model file stored in the terminal; an operation of selecting the file corresponding to the target 3D model is received, the selection operation is used as the 3D model input operation, and the target 3D model corresponding to the selection operation is imported.

Figure 4:
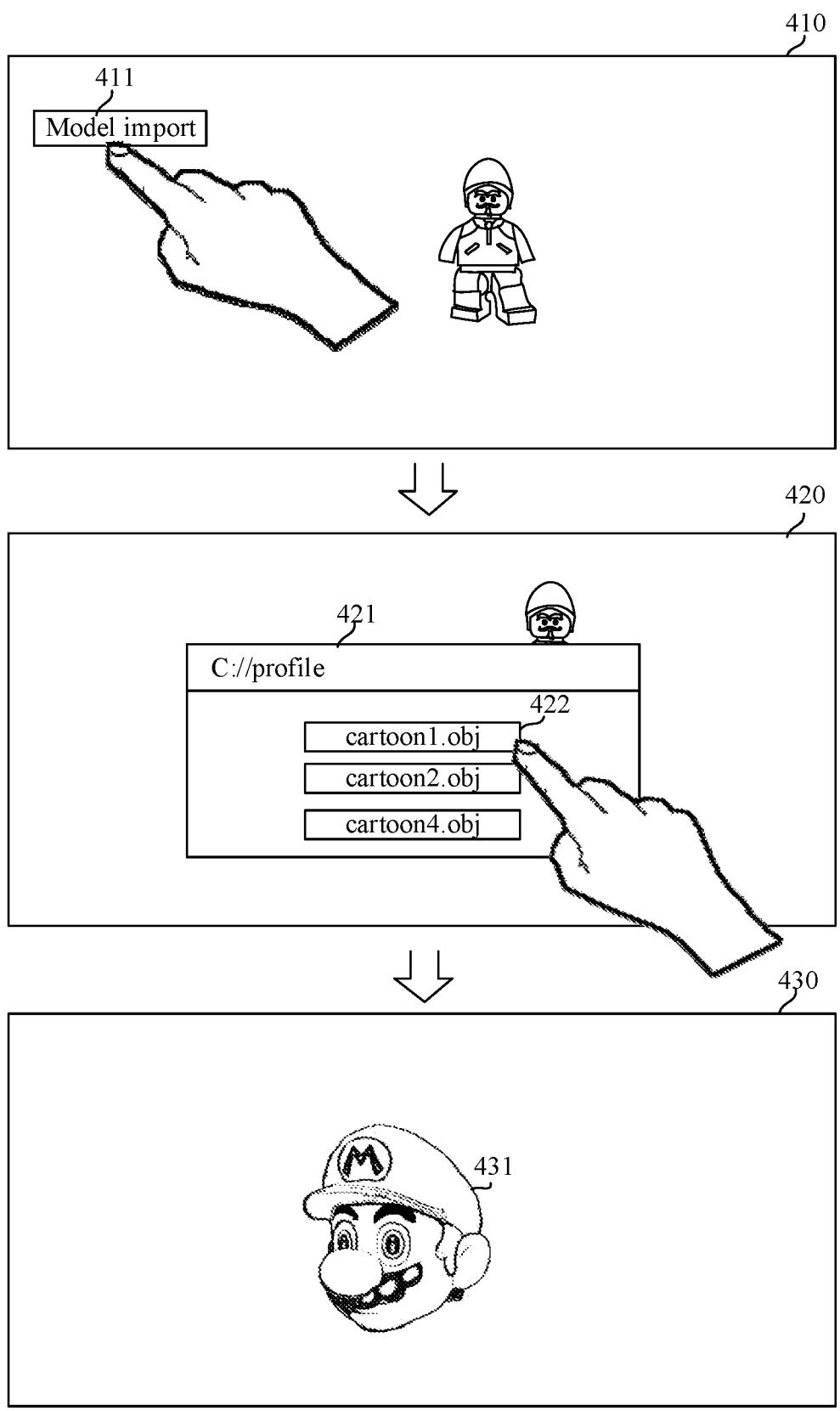
FIG. 4 is a schematic diagram of an interface of a method for importing a target 3D model referenced in FIG. 3 according to one or more embodiments of the present disclosure.

For example, referring to FIG. 4, an environment interface 410 includes a model import control 411. After a user selects the model import control 411, a model import interface 420 is displayed. The model import interface includes an importable model file list 421 stored in the terminal. After the user selects an importable model file 422, a target 3D model 431 corresponding to the importable model file 422 is imported, and a model preview interface 430 is displayed. The model preview interface 430 includes the target 3D model 431.

In the second method, a model production interface is displayed, the model production interface being an interface corresponding to a model production function provided in the application; after the target 3D model is produced in the model production interface, a confirmation control is selected to generate the target 3D model as the 3D model used for generating the target object in the application.

Step 303: Receive a position input operation, the position input operation being used for determining a display position of the target object in the virtual environment.

In certain embodiments, after the display position of the target object in the virtual environment is determined, a display size of the target object in the virtual environment is determined, and the display size is determined by using at least one of the following methods:

In the first method, the display size of the target object is directly determined according to the size of the target 3D model.

In the second method, the target 3D model is previewed at the display position in the virtual environment, and the display size of the target 3D model in the virtual environment is adjusted through a size adjustment operation, thereby adjusting the display size of the generated target object in the virtual environment.

In the third method, a length of the target object in a target dimension is inputted, and the display size of the target object is determined according to a ratio of three dimensions of the target 3D model and the length in the target dimension, the length of the target object in the target dimension being set according to the quantity of voxel blocks of the target object in the target dimension.

In the steps 302 and 303, step 302 may be performed before step 303, or step 303 may be performed before step 302, or step 302 and step 303 may be performed simultaneously. The sequence of performing step 302 and step 303 is not limited in this embodiment.

Step 304: Display the target object at the display position in the virtual environment according to the 3D model input operation and the position input operation, the target object being obtained by filling with voxel blocks within a contour range of the target 3D model.

In certain embodiments, the voxel blocks may be filled within the contour range of the target 3D model by using at least one of the following methods:

In the first method, the voxel blocks located on the contour of the target 3D model are determined, and the voxel blocks are filled within the contour according to the voxel blocks located on the contour of the target 3D model.

In the second method, the voxel blocks are stacked layer by layer along the contour of the target 3D model directly, and if a stacked voxel block has no intersection with the target 3D model, the voxel block that has no intersection with the target 3D model is discarded.

Figure 5:
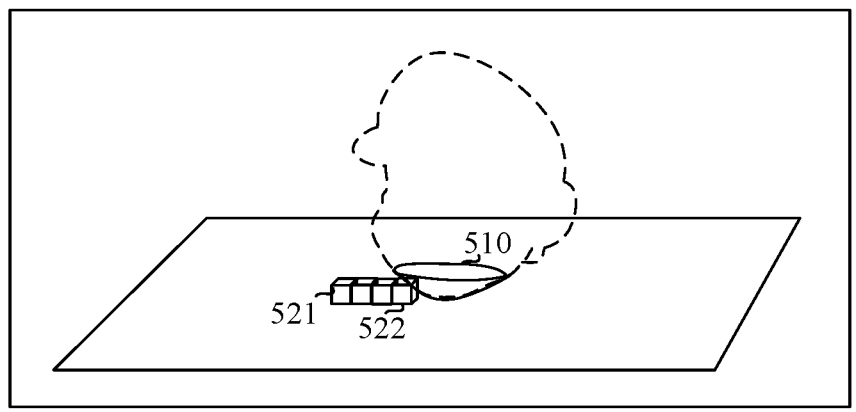
FIG. 5 is a schematic diagram of an interface of a method for determining a target voxel region referenced in FIG. 3 according to one or more embodiments of the present disclosure.

For example, referring to FIG. 5, when the target object corresponding to the target 3D model is stacked layer by layer, voxel blocks at a bottom layer are first stacked. A contour 510 of the target 3D model corresponding to the bottom layer is shown in FIG. 5. When the voxel blocks are stacked, a voxel block 521 has no intersection with the target 3D model, and the voxel block 521 is discarded. A voxel block 522 intersects the target 3D model, and the voxel block 522 is retained.

In certain embodiments, step 304 may be implemented by the terminal, or the terminal may send the target 3D model to the server. After the server constructs the target object, a construction result of the target object is sent to the terminal, to be displayed at the display position.

In summary, according to the virtual-environment-based object construction method provided in this embodiment, the target 3D model is imported in the virtual environment and the display position of the target object is selected; then the target object is generated by filling with the voxel blocks within the contour range of the target 3D model in the virtual environment, and is displayed at the display position. This avoids the problem that the player cannot accurately control the structure of the voxel blocks during manual construction of the target object and thus fails to construct the object. In addition, the method provided in this embodiment improves the efficiency and the accuracy of the object construction.

Figure 6:
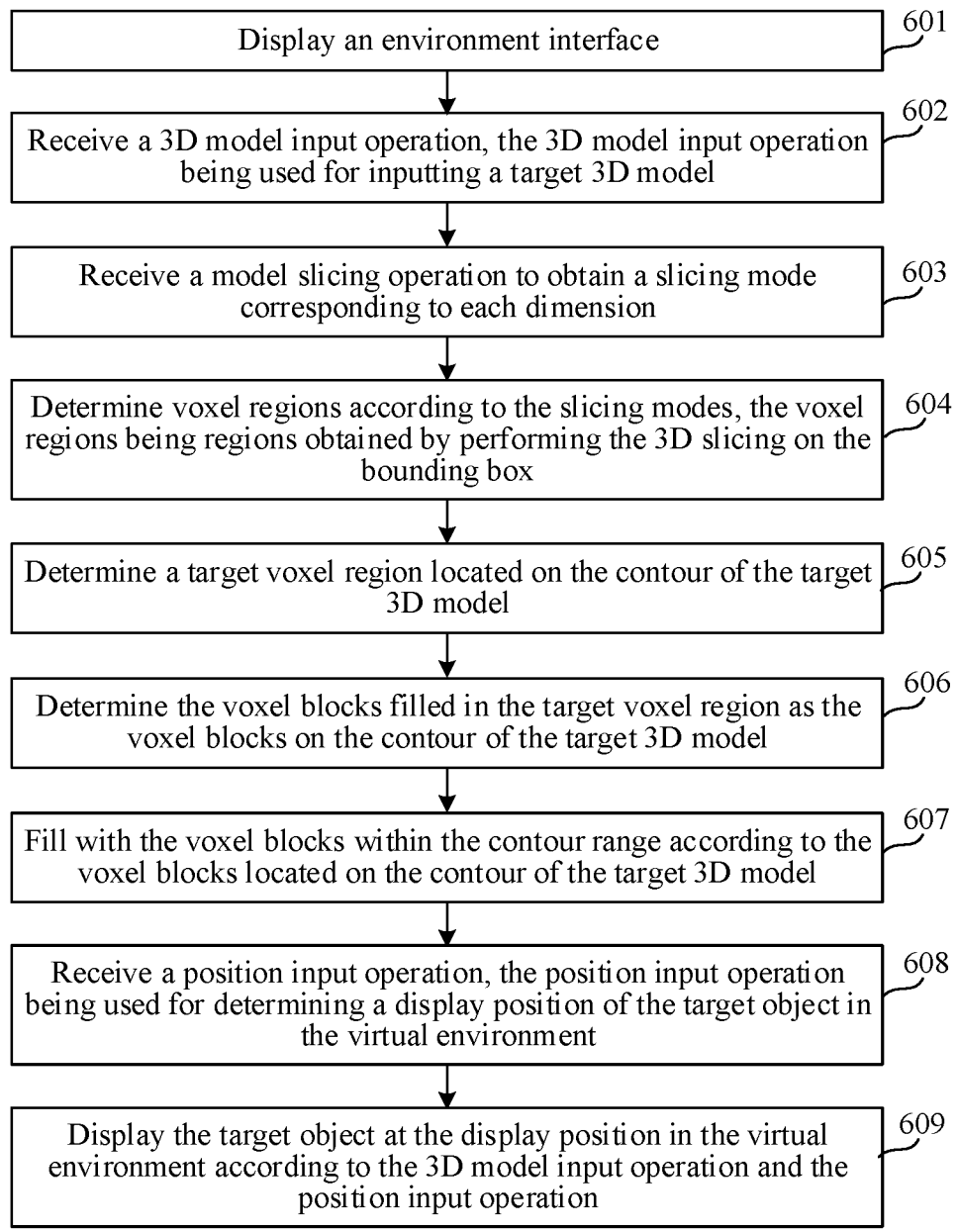
FIG. 6 is a flowchart of a virtual-environment-based object construction method according to one or more embodiments of the present disclosure.

In an optional embodiment, the target object is obtained by determining the voxel blocks located on the contour of the target 3D model and filling with the voxel blocks within the contour range. FIG. 6 is a flowchart of a virtual-environment-based object construction method according to another exemplary embodiment of the present disclosure. This method may be implemented in a terminal or a combination of a terminal and a server. As shown in FIG. 6, the method includes:

Step 601: Display an environment interface.

In certain embodiments, the environment interface includes an image corresponding to a virtual environment.

In certain embodiments, the method is applicable to a sandbox game. The sandbox game provides a virtual environment, and the virtual environment includes a virtual entity. The player can control the virtual entity to move in the virtual environment, construct voxel blocks, or perform other operations. In certain embodiments, currently available voxel blocks are also displayed in the environment interface.

Step 602: Receive a 3D model input operation, the 3D model input operation being used for inputting a target 3D model.

In certain embodiments, the target 3D model is used for determining a style of a to-be-constructed target object. In certain embodiments, the target 3D model is used for determining a contour of the target object. In certain embodiments, the voxel blocks filled within the contour range of the target 3D model may be voxel blocks of the same color, or corresponding voxel blocks may be filled according to the color of the appearance of the target 3D model, or the target object corresponding to the target 3D model may be filled with voxel blocks according to a set color filling rule.

In certain embodiments, the input method of the target 3D model is described in detail in step 302.

Step 603: Receive a model slicing operation to obtain a slicing mode corresponding to each dimension.

In certain embodiments, the model slicing operation is used for performing 3D slicing on a bounding box corresponding to the target 3D model. In certain embodiments, the bounding box is the smallest cuboid box surrounding the target 3D model; or, the bounding box is a cuboid box corresponding to a 3D size the target 3D model generated according to the 3D size of the target 3D model.

In certain embodiments, the slicing mode includes any one of a slice quantity corresponding to each dimension or a slice size corresponding to each dimension.

In certain embodiments, the 3D slicing means slicing the bounding box in three dimensions according to the slicing mode corresponding to each dimension.

In certain embodiments, the model slicing operation may be performed by using any of the following methods:

In the first method, a slice quantity input operation is received, the slice quantity input operation including an operation of inputting slice quantities of three dimensions of the target 3D model; and the 3D slicing is performed on the bounding box based on the slice quantities according to the slice quantity input operation.

Figure 7:
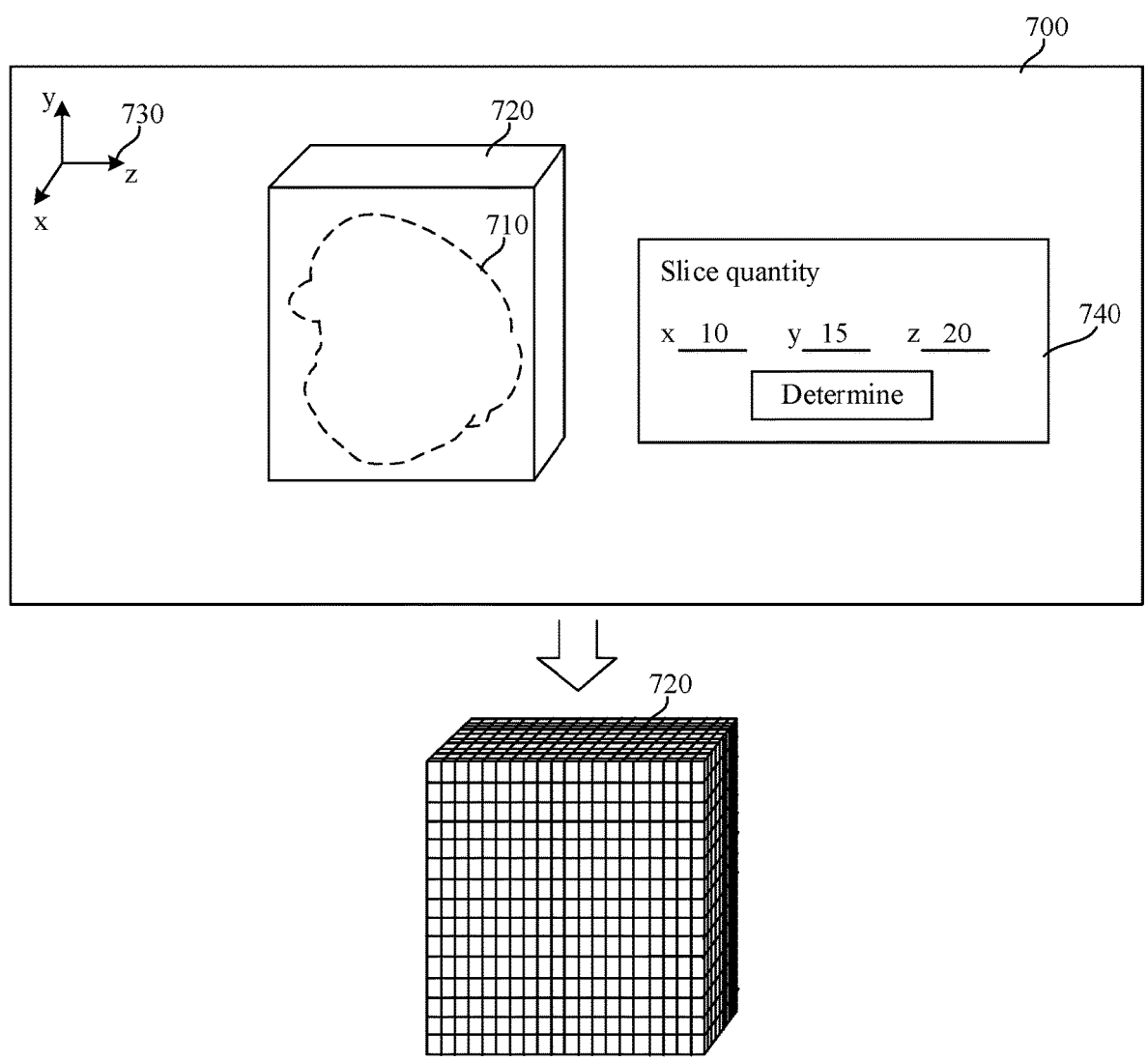
FIG. 7 is a schematic diagram of an interface of a method for slicing a target 3D model referenced in FIG. 6 according to one or more embodiments of the present disclosure.

For example, referring to FIG. 7, a bounding box 720 corresponding to a target 3D model 710 is displayed in a virtual environment interface 700. By default, an x-axis direction, a y-axis direction, and a z-axis direction of the 3D directions in the virtual environment are shown as coordinate axes 730. A slice quantity setting operation in a slice quantity input box 740 is received, and a slice quantity setting result is as follows: dividing into 10 parts in the x-axis direction, 15 parts in the y-axis direction, and 20 parts in the z-axis direction. Then the 3D slicing is performed on the bounding box 720 according to the slice quantity setting result, where the bounding box 720 is equally divided into 10 parts in the x-axis direction, 15 parts in the y-axis direction, and 20 parts in the z-axis direction.

In the second method, a sliding slicing operation is received, and the 3D slicing is performed on the bounding box according to the sliding slicing operation.

In certain embodiments, the slice quantity corresponding to each dimension is used for determining a degree of refinement of the target object generated by the target 3D model. For example, a larger slice quantity indicates a higher degree of refinement of the target object, and the similarity between the target object and the target 3D model is also higher; and a smaller slice quantity indicates a lower degree of refinement of the target object, and the similarity between the target object and the target 3D model is lower.

Step 604: Determine voxel regions according to the slicing modes, the voxel regions being regions obtained by performing the 3D slicing on the bounding box.

In certain embodiments, according to the 3D slicing performed on the bounding box, the slicing operation is performed in all three dimensions of the bounding box, the voxel regions are obtained according to the slicing operation in the three dimensions. The voxel regions are regions obtained after the 3D slicing. In certain embodiments, the voxel regions are used for being filled with the voxel blocks.

Step 605: Determine a target voxel region located on the contour of the target 3D model.

In certain embodiments, the contour of the target 3D model is formed by triangular patches, and the target 3D model is a hollow model with a contour formed by the triangular patches.

In certain embodiments, the voxel region is determined to be the target voxel region located on the contour of the target 3D model in response to determining the voxel region intersects the triangular patch. In certain embodiments, intersection of the voxel region and the triangular patch may be that the triangular patch is in the voxel region, and/or the triangular patch is located on a regional plane of the voxel region.

Figure 8:
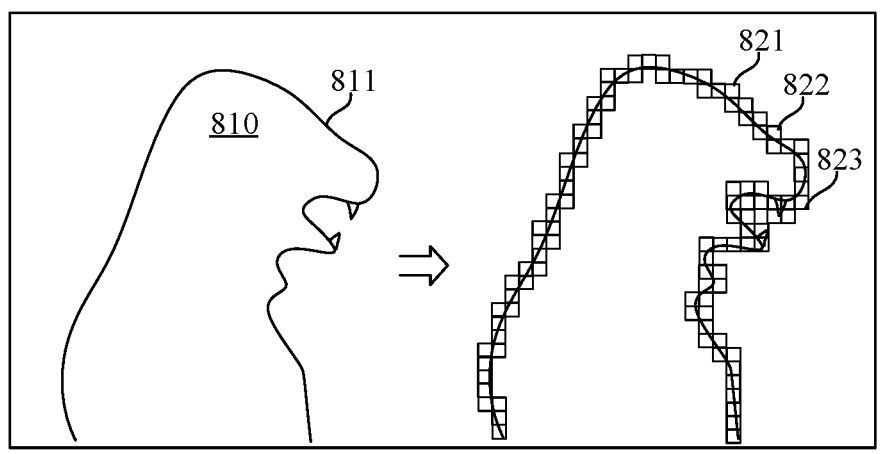
FIG. 8 is a schematic diagram of a method for determining a target voxel region referenced in FIG. 6 according to one or more embodiments of the present disclosure.

For example, referring to FIG. 8, a section 810 is a transverse section of the target 3D model. In this section, target voxel regions on a contour 811 are determined. Voxel regions that intersect the triangular patches on the contour 811 are determined to be the target voxel regions, such as a target voxel region 821, a target voxel region 822, and a target voxel region 823 in FIG. 8.

Step 606: Determine the voxel blocks filled in the target voxel region as the voxel blocks on the contour of the target 3D model.

In certain embodiments, each voxel region is used for being filled with the voxel blocks, and the voxel blocks filled in the target voxel region are the voxel blocks on the contour of the target 3D model. In certain embodiments, colors of the voxel blocks filled in the same voxel region are the same.

Step 607: Fill with the voxel blocks within the contour range according to the voxel blocks located on the contour of the target 3D model.

In certain embodiments, in the process of filling with the voxel blocks within the contour range according to the voxel blocks located on the contour of the target 3D model, the voxel regions are scanned in the bounding box first. In certain embodiments, the scanning process takes a specific direction as the scanning direction.

A relationship between a normal direction of the triangular patch and a scanning direction is determined when or in response to determining the scanning proceeds to the target voxel region including the triangular patch, the normal direction of the triangular patch correspondingly facing to outside of the target 3D model. The voxel blocks are filled in the scanning direction when or in response to determining the normal direction and the scanning direction are relatively opposite, and filling with the voxel blocks in the scanning direction is stopped when or in response to determining the normal direction and the scanning direction are relatively the same.

In certain embodiments, when the normal direction and the scanning direction are relatively the same, and the next voxel region in the scanning direction is also a target voxel region, a recognition result of the next target voxel region prevails, that is, when the normal direction of the triangular patch corresponding to the next target voxel region is relatively the same as the scanning direction, the filling with the voxel blocks in the scanning direction is stopped.

In certain embodiments, the foregoing normal direction and the scanning direction being relatively opposite means that an included angle between the normal direction and the scanning direction is greater than a right angle. Similarly, the foregoing normal direction and the scanning direction being relatively the same means that an included angle between the normal direction and the scanning direction is less than or equal to a right angle.

Figure 9:
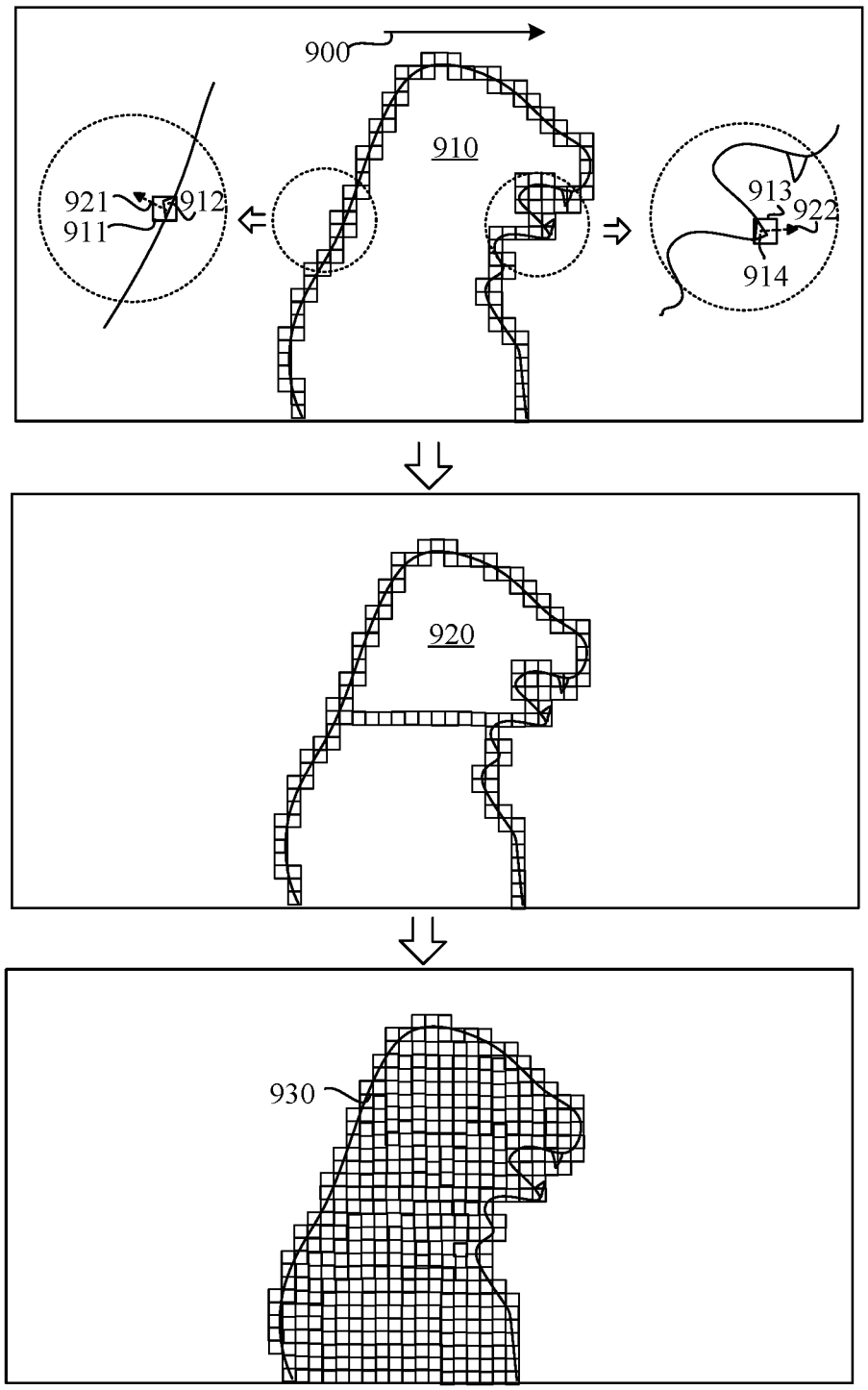
FIG. 9 is a schematic diagram of a method for filling a voxel region referenced in FIG. 6 according to one or more embodiments of the present disclosure.

For example, referring to FIG. 9, a section 910 is a transverse section of the target 3D model, and the voxel region within the contour range of the target 3D model is filled according to the voxel regions on the contour of the target 3D model, as shown in FIG. 9. The bounding box of the target 3D model is scanned along a direction indicated by a solid arrow 900. When the scanning proceeds to a target voxel region 911, a normal direction of a triangular patch 912 in the target voxel region 911 is along a direction indicated by a dashed arrow 921 as shown in FIG. 9, and the normal direction is relatively opposite to the scanning direction. Therefore, the voxel region along the scanning direction is a voxel region that may need to be filled with the voxel blocks, and the voxel blocks are filled in the voxel region along the voxel direction. As shown in FIG. 9, the scanning proceeds to a target voxel region 913 along the scanning direction, a normal direction of a triangular patch 914 in the target voxel region 913 is along a direction indicated by a dashed arrow 922 as shown in FIG. 9, and the normal direction and the scanning direction are relatively the same. In this case, a voxel region subsequently scanned along the scanning direction is a voxel region that does not need to be filled with the voxel blocks. A filling result of the layer along the scanning direction is shown as a transverse section 920, and a filling interface of the target 3D model is shown as a transverse section 930.

Step 608: Receive a position input operation, the position input operation being used for determining a display position of the target object in the virtual environment.

In certain embodiments, the position input operation may be determined by dragging the target 3D model in the virtual environment. Alternatively, the target object may be generated for preview after step 607, and the display position of the target object in the virtual environment is determined by dragging the target object in the virtual environment.

In certain embodiments, in the process of dragging the target object in the virtual environment, the position of the target object may be previewed by highlighting the position of the target object in the virtual environment. For example, the position of the target object is highlighted in black.

Step 609: Display the target object at the display position in the virtual environment according to the 3D model input operation and the position input operation.

Figure 10:
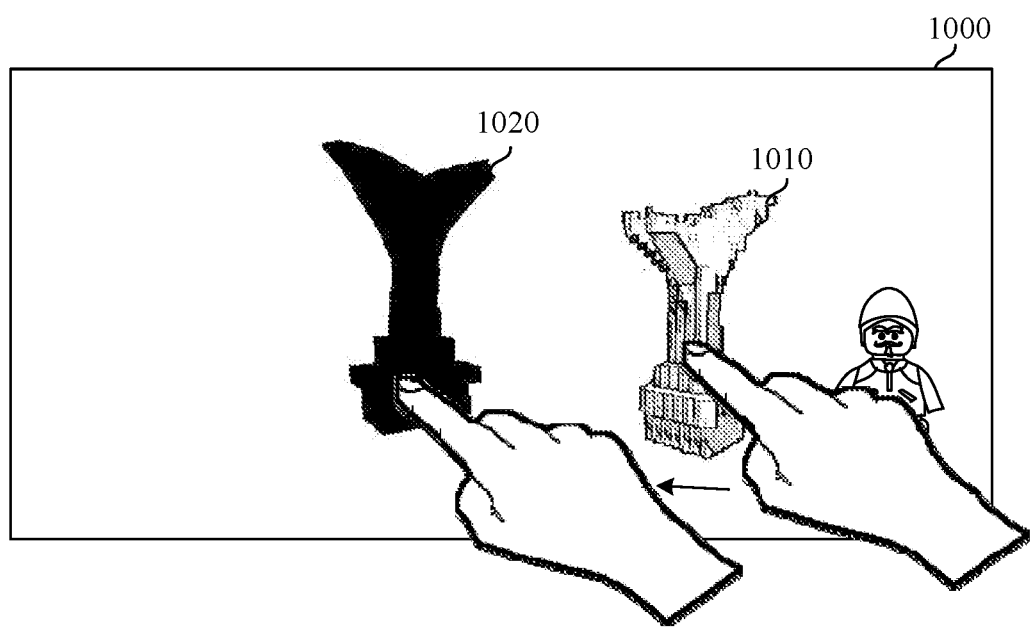
FIG. 10 is a schematic diagram of an interface of a method for determining a position of a target object referenced in FIG. 6 according to one or more embodiments of the present disclosure.

For example, as shown in FIG. 10, the position of a target object 1010 is adjusted in an environment interface 1000. After the target object 1010 is selected, a drag operation is performed. In the dragging process, the position of the target object 1010 is previewed as a black region 1020. When the position is selected, the target object 1010 is displayed at the position.

In summary, according to the virtual-environment-based object construction method provided in this embodiment, the target 3D model is imported in the virtual environment and the display position of the target object is selected; then the target object is generated by filling with the voxel blocks within the contour range of the target 3D model in the virtual environment, and is displayed at the display position. This avoids the problem that the player cannot accurately control the structure of the voxel blocks during manual construction of the target object and thus fails to construct the object. In addition, the method provided in this embodiment improves the efficiency and the accuracy of the object construction.

According to the method provided in this embodiment, after the voxel blocks on the contour of the target 3D model are determined, the voxel blocks are filled within the contour range based on the voxel blocks on the contour. Therefore, the filling of the voxel blocks is more accurate and the generation efficiency of the target object is higher.

Figure 11:
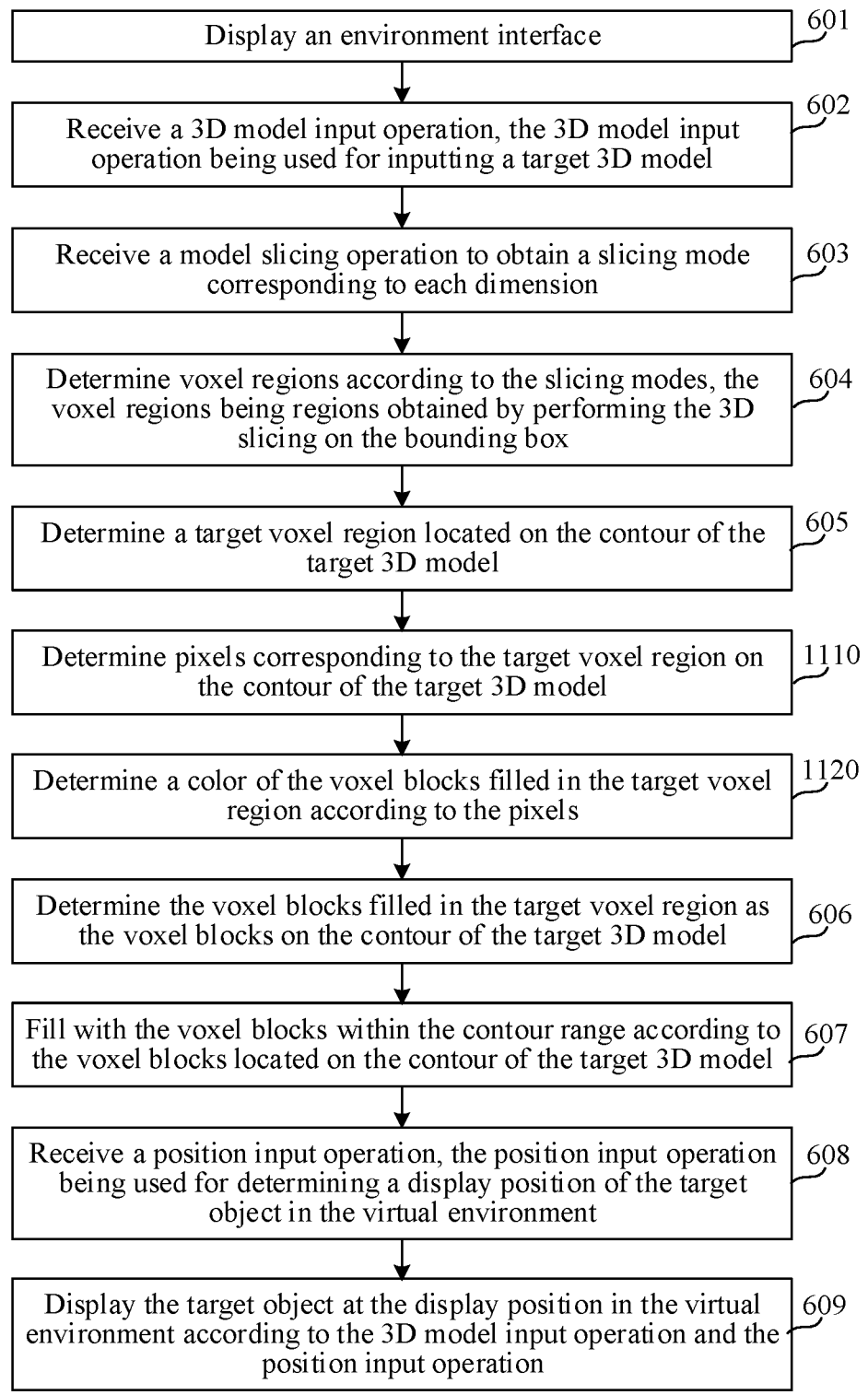
FIG. 11 is a schematic flowchart of a virtual-environment-based object construction method according to one or more embodiments of the present disclosure.

In an optional embodiment, the color of the voxel blocks forming the target object is determined according to the color of the target 3D model. FIG. 11 is a flowchart of a virtual-environment-based object construction method based on the embodiment shown in FIG. 6. On the basis of the flowchart shown in FIG. 6, step 1110 and step 1120 are added. The method includes:

Step 601: Display an environment interface.

In certain embodiments, the environment interface includes an image corresponding to a virtual environment.

In certain embodiments, the method is applicable to a sandbox game. The sandbox game provides a virtual environment, and the virtual environment includes a virtual entity. The player can control the virtual entity to move in the virtual environment, construct voxel blocks, or perform other operations. In certain embodiments, currently available voxel blocks are also displayed in the environment interface.

Step 602: Receive a 3D model input operation, the 3D model input operation being used for inputting a target 3D model.

In certain embodiments, the target 3D model is used for determining a style of a to-be-constructed target object. In certain embodiments, the target 3D model is used for determining a contour of the target object. In certain embodiments, the voxel blocks filled within the contour range of the target 3D model may be voxel blocks of the same color, or corresponding voxel blocks may be filled according to the color of the appearance of the target 3D model, or the target object corresponding to the target 3D model may be filled with voxel blocks according to a set color filling rule.

Step 603: Receive a model slicing operation to obtain a slicing mode corresponding to each dimension.

In certain embodiments, the model slicing operation is used for performing 3D slicing on a bounding box corresponding to the target 3D model. In certain embodiments, the bounding box is the smallest cuboid box surrounding the target 3D model; or, the bounding box is a cuboid box corresponding to a 3D size of the target 3D model generated according to the 3D size of the target 3D model.

Step 604: Determine voxel regions according to the slicing modes, the voxel regions being regions obtained by performing the 3D slicing on the bounding box.

In certain embodiments, the voxel regions are obtained according to the slicing operation in the three dimensions. The voxel regions are regions obtained after the 3D slicing. In certain embodiments, the voxel regions are used for being filled with the voxel blocks.

Step 605: Determine a target voxel region located on the contour of the target 3D model.

In certain embodiments, the contour of the target 3D model is formed by triangular patches, and the target 3D model is a hollow model with a contour formed by the triangular patches.

Step 1110: Determine pixels corresponding to the target voxel region on the contour of the target 3D model.

In certain embodiments, the contour of the target 3D model corresponding to the target voxel region includes a contour part intersecting the target voxel region. The contour part includes a contour part in the target voxel region and a contour part on the plane of the target voxel region.

Step 1120: Determine a color of the voxel blocks filled in the target voxel region according to the pixels.

In certain embodiments, each target voxel region may correspond to a plurality of pixels on the contour of the target 3D model. If colors of the plurality of pixels are different, a color of pixels that account for the highest proportion is used as the color corresponding to the target voxel region, or an average color of all pixels corresponding to the target voxel region is used as the color corresponding to the target voxel region. The average color is calculated by RGB values of each pixel.

In certain embodiments, the pixels corresponding to the target voxel region on the contour of the target 3D model are traversed, and a first color corresponding to the target voxel region is determined. Chromatic aberration calculation between the first color and colors in a preset color list is performed to obtain a second color with a smallest chromatic aberration calculation result in the preset color list. The second color is the color of the voxel blocks filled in the target voxel region. In certain embodiments, the preset color list is a list of colors including all colors of the voxel blocks provided in the present disclosure. A color with the smallest chromatic aberration from the first color is determined in the preset color list by calculating chromatic aberrations between the first color and the colors in the preset color list. Then the voxel blocks of the determined color are used as the voxel blocks to fill the target voxel region.

In certain embodiments, during calculation of the chromatic aberrations between the first color and the colors in the preset color list, a color distance between two colors may be calculated by a Euclidean distance calculation method. A greater color distance indicates a larger chromatic aberration between the two colors, and two colors with higher similarity corresponds to a smaller color distance. During calculation of the color distance, in an RGB control, a distance between two colors C1 and C2 can be calculated by a Formula 1 provided in the following Euclidean distance calculation method, where C1 is the foregoing first color, and C2 is a color in the preset color list:

$$\|C_1 - C_2\| = \sqrt{(C_{1,R} - C_{2,R})^2 + (C_{1,G} - C_{2,G})^2 + (C_{1,B} - C_{2,B})^2}, \quad \text{Formula 1:}$$

where represents a red value of the first color C1, $C_{2,R}$ represents a red value of the color C2, $C_{1,G}$ represents a green value of the first color C1, $C_{2,G}$ represents a green value of the color C2, $C_{1,B}$ represents a blue value of the first color C1, and $C_{2,B}$ represents a blue value of the color C2.

After the RGB values of the first color C1 and the color C2 in the preset color list are substituted into the Formula 1, the chromatic aberration between the first color C1 and the color C2 in the preset color list is obtained.

In certain embodiments, in addition to the Euclidean distance calculation method, the chromatic aberration calculation method also includes the RGB square method, CIELab chromatic aberration calculation formulas (such as CIELab 76 and CIELab 94), and CIEDE 2000. The method for chromatic aberration calculation is not limited in the embodiments of the present disclosure.

Step 606: Determine the voxel blocks filled in the target voxel region as the voxel blocks on the contour of the target 3D model.

In certain embodiments, each voxel region is used for being filled with the voxel blocks, and the voxel blocks filled in the target voxel region are the voxel blocks on the contour of the target 3D model. In certain embodiments, colors of the voxel blocks filled in the same voxel region are the same.

Step 607: Fill with the voxel blocks within the contour range according to the voxel blocks located on the contour of the target 3D model.

In certain embodiments, when the voxel blocks are filled within the contour range of the target 3D model, the voxel blocks of a preset color may be filled, or the color of the voxel blocks within the contour range may be determined according to the scanning direction of the voxel region and according to the color of the voxel blocks corresponding to the target voxel region. For example, when scanning is performed in a first scanning direction, the scanning first proceeds to a target voxel region A on the contour of the target 3D model. Voxel blocks in the target voxel region A are the voxel blocks of the first color, and then voxel blocks that continue to be scanned and filled in the scanning direction are all voxel blocks of the first color.

Step 608: Receive a position input operation, the position input operation being used for determining a display position of the target object in the virtual environment.

In certain embodiments, the position input operation may be determined by dragging the target 3D model in the virtual environment. Alternatively, the target object may be generated for preview after the foregoing step, and the display position of the target object in the virtual environment is determined by dragging the target object in the virtual environment.

Step 609: Display the target object at the display position in the virtual environment according to the 3D model input operation and the position input operation.

In summary, according to the virtual-environment-based object construction method provided in this embodiment, the target 3D model is imported in the virtual environment and the display position of the target object is selected; then the target object is generated by filling with the voxel blocks within the contour range of the target 3D model in the virtual environment, and is displayed at the display position. This avoids the problem that the player cannot accurately control the structure of the voxel blocks during manual construction of the target object and thus fails to construct the object. In addition, the method provided in this embodiment improves the efficiency and the accuracy of the object construction.

According to the method provided in this embodiment, the color of the voxel blocks filled in the target voxel region is determined by the pixels corresponding to the target voxel region. A color scheme of the constructed target object is more matched with a color scheme of the target 3D model, and the similarity between the target object and the target 3D model is higher.

Figure 12:
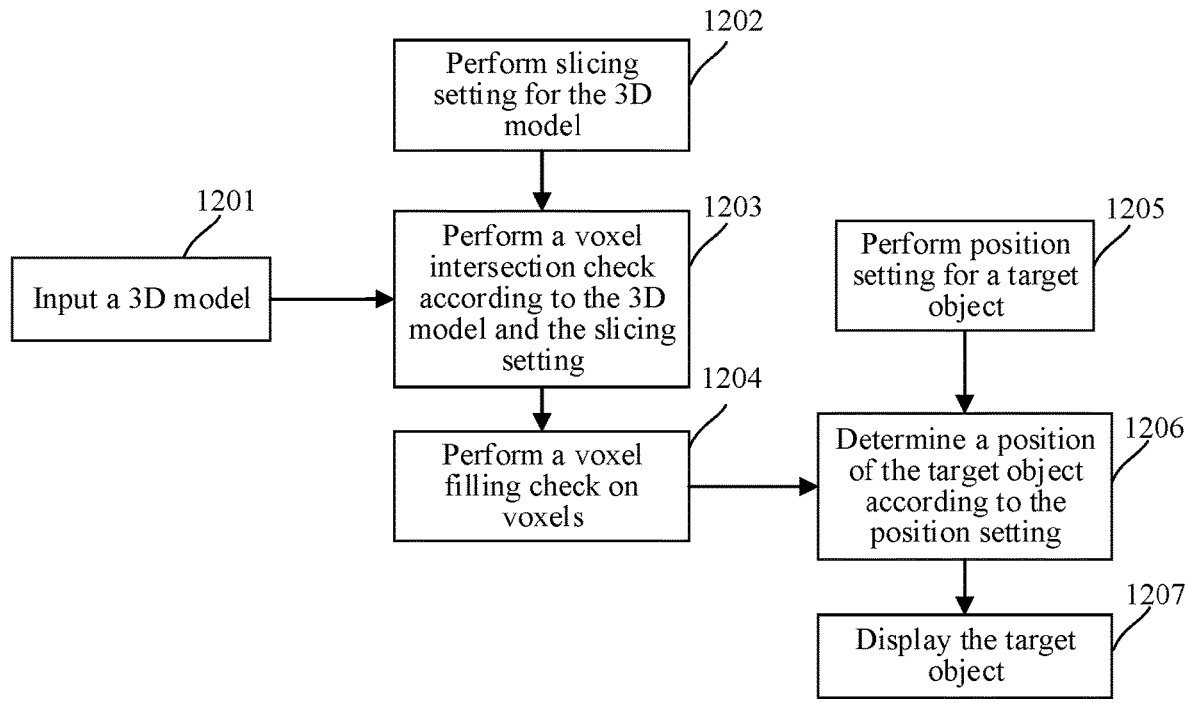
FIG. 12 is a schematic flowchart of a virtual-environment-based object construction method according to one or more embodiments of the present disclosure.

FIG. 12 is an overall flowchart of a virtual-environment-based object construction method according to an exemplary embodiment of the present disclosure. As shown in FIG. 12, the method includes the following steps:

Step 1201: Input a 3D model.

In certain embodiments, the target 3D model is used for determining a style of a to-be-constructed target object. In certain embodiments, the target 3D model is used for determining a contour of the target object. In certain embodiments, the voxel blocks filled within the contour range of the target 3D model may be voxel blocks of the same color, or corresponding voxel blocks may be filled according to the color of the appearance of the target 3D model, or the target object corresponding to the target 3D model may be filled with voxel blocks according to a set color filling rule.

In certain embodiments, the input method of the target 3D model is described in detail in step 302, and details are not described herein again.

Step 1202: Perform slicing setting for the 3D model.

In certain embodiments, the model slicing operation is used for performing 3D slicing on a bounding box corresponding to the target 3D model. In certain embodiments, the bounding box is the smallest cuboid box surrounding the target 3D model; or, the bounding box is a cuboid box corresponding to a 3D size of the target 3D model generated according to the 3D size of the target 3D model.

In certain embodiments, for the slicing setting method, refer to step 603. Details are not repeated herein.

Step 1203: Perform a voxel intersection check according to the 3D model and the slicing setting.

In certain embodiments, the voxel intersection check is used for determining a target voxel region that intersects the contour of the target 3D model. In certain embodiments, the target voxel region is determined by an intersecting relationship between the triangular patches on the contour of the target 3D model and the voxel regions.

Step 1204: Perform a voxel filling check on voxels.

In certain embodiments, the voxel filling check is used for filling with the voxel blocks within the contour range of the target 3D model according to the target voxel region.

Step 1205: Perform position setting for a target object.

In certain embodiments, the position setting may be determined by dragging the target 3D model in the virtual environment. Alternatively, the target object may be generated for preview after the foregoing step, and the display position of the target object in the virtual environment is determined by dragging the target object in the virtual environment.

Step 1206: Determine a position of the target object according to the position setting.

Step 1207: Display the target object.

In summary, according to the virtual-environment-based object construction method provided in this embodiment, the target 3D model is imported in the virtual environment and the display position of the target object is selected; then the target object is generated by filling with the voxel blocks within the contour range of the target 3D model in the virtual environment, and is displayed at the display position. This avoids the problem that the player cannot accurately control the structure of the voxel blocks during manual construction of the target object and thus fails to construct the object. In addition, the method provided in this embodiment improves the efficiency and the accuracy of the object construction.

Although the steps in the flowcharts of FIG. 3, FIG. 6, FIG. 11, and FIG. 12 are displayed in sequence based on indication of arrows, the steps are not necessarily performed in sequence based on the sequence indicated by the arrows. Unless otherwise explicitly specified in the present disclosure, execution of the steps is not strictly limited, and the steps may be performed in other sequences. In addition, at least some steps in FIG. 3, FIG. 6, FIG. 11, and FIG. 12 may include a plurality of substeps or a plurality of stages. The substeps or the stages are not necessarily performed at a same moment, and instead may be performed at different moments. The substeps or the stages are not necessarily performed in sequence, but may be performed in turn or alternately with another step or at least some of substeps or stages of the another step.

Figure 13:
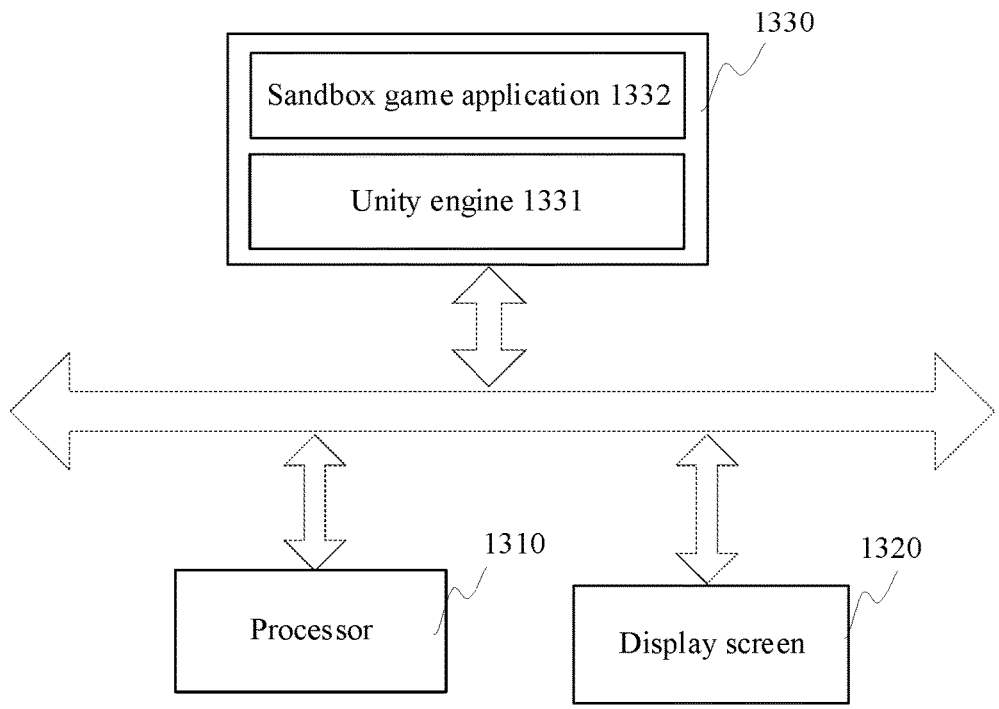
FIG. 13 is a schematic structural block diagram of a terminal according to one or more embodiments of the present disclosure.

FIG. 13 is a structural block diagram of a terminal according to an exemplary embodiment of the present disclosure. As shown in FIG. 13, the terminal includes a processor 1310, a display screen 1320, and a memory 1330.

The processor 1310 includes a CPU and a GPU. The CPU is mainly responsible for implementing computing tasks of the terminal, and the GPU is mainly responsible for implementing display tasks of the terminal. That is, the GPU is responsible for rendering display content according to data transmitted by the CPU, and displaying the display content on the display screen 1320.

In certain embodiments, a sandbox game application 1332 developed based on a Unity engine 1331 is installed in the terminal, and a virtual environment is provided in the sandbox game application 1332. In the virtual environment of the sandbox game application 1332, a virtual entity may construct a virtual object through using voxel blocks, and the constructed virtual object is displayed in the virtual environment by using the CPU and GPU. The user may also import the target 3D model into the sandbox game application 1332 by using the virtual-environment-based object construction method provided in the embodiments of the present disclosure, and the target object corresponding to the target 3D model is displayed in the virtual environment of the sandbox game application 1332.

Figure 14:
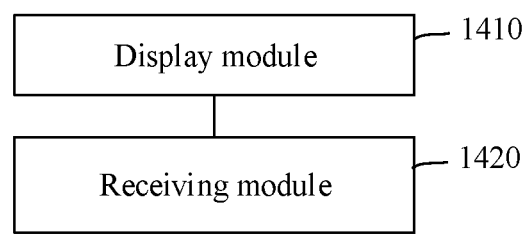
FIG. 14 is a schematic structural block diagram of a virtual-environment-based object construction apparatus according to one or more embodiments of the present disclosure.

FIG. 14 is a structural block diagram of a virtual-environment-based object construction apparatus according to an exemplary embodiment of the present disclosure. The apparatus is applicable to a terminal, and as shown in FIG. 14, the apparatus includes a display module 1410 and a receiving module 1420. The display module 1410 is configured to display an environment interface, the environment interface including an image corresponding to a virtual environment. The receiving module 1420 is configured to receive a 3D model input operation, the 3D model input operation being used for inputting a target 3D model, the target 3D model being used for determining a style of a to-be-constructed target object. The receiving module 1420 is further configured to receive a position input operation, the position input operation being used for determining a display position of the target object in the virtual environment. The display module 1410 is further configured to display the target object at the display position in the virtual environment according to the 3D model input operation and the position input operation, the target object being obtained by filling with voxel blocks within a contour range of the target 3D model.

Figure 15:
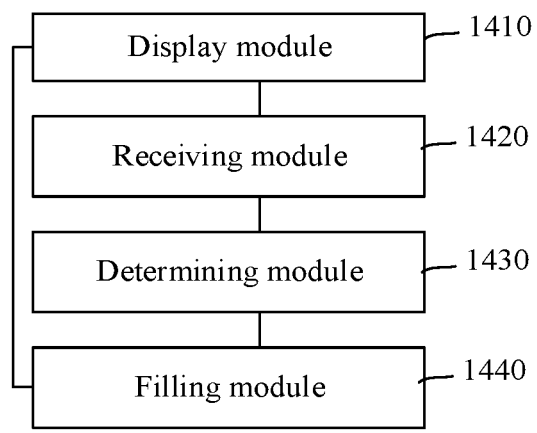
FIG. 15 is a schematic structural block diagram of a virtual-environment-based object construction apparatus according to one or more embodiments of the present disclosure.

In an optional embodiment, as shown in FIG. 15, the apparatus further includes: a determining module 1430, configured to determine the voxel blocks located on a contour of the target 3D model; and a filling module 1440, configured to fill with the voxel blocks within the contour range according to the voxel blocks located on the contour of the target 3D model.

In an optional embodiment, the receiving module 1420 is further configured to receive a model slicing operation to obtain a slicing mode corresponding to each dimension, the model slicing operation being used for performing 3D slicing on a bounding box corresponding to the target 3D model.

The determining module 1430 is further configured to determine voxel regions according to the model slicing operation, the voxel regions being regions obtained by performing the 3D slicing on the bounding box, the voxel regions being used for being filled with the voxel blocks.

The determining module 1430 is further configured to determine a target voxel region located on the contour of the target 3D model.

The determining module 1430 is further configured to determine the voxel blocks filled in the target voxel region as the voxel blocks on the contour of the target 3D model.

In an optional embodiment, the receiving module 1420 is further configured to receive a slice quantity input operation, the slice quantity input operation including an operation of inputting slice quantities of three dimensions of the target 3D model; and performing the 3D slicing on the bounding box based on the slice quantities according to the slice quantity input operation; or the receiving module 1420 is further configured to receive a sliding slicing operation, and perform the 3D slicing on the bounding box according to the sliding slicing operation, the slice quantity corresponding to each dimension being used for determining a degree of refinement of the target object generated by the target 3D model.

In an optional embodiment, the contour of the target 3D model is formed by triangular patches; and the determining module 1430 is further configured to determine that the voxel region is the target voxel region located on the contour of the target 3D model when or in response to determining the voxel region intersects the triangular patch.

In an optional embodiment, the filling module 1440 is further configured to scan the voxel regions in the bounding box, and determine a relationship between a normal direction of the triangular patch and a scanning direction when or in response to determining the scanning proceeds to the target voxel region including the triangular patch, the normal direction of the triangular patch correspondingly facing to outside of the target 3D model;

the filling module 1440 is further configured to fill with the voxel blocks in the scanning direction when or in response to determining the normal direction and the scanning direction are relatively opposite; and the filling module 1440 is further configured to stop filling with the voxel blocks in the scanning direction when or in response to determining the normal direction and the scanning direction are relatively the same.

In an optional embodiment, the determining module 1430 is further configured to determine pixels corresponding to the target voxel region on the contour of the target 3D model; and determine a color of the voxel blocks filled in the target voxel region according to the pixel.

In summary, according to the virtual-environment-based object construction apparatus provided in this embodiment, the target 3D model is imported in the virtual environment and the display position of the target object is selected; then the target object is generated by filling with the voxel blocks within the contour range of the target 3D model in the virtual environment, and is displayed at the display position. This avoids the problem that the player cannot accurately control the structure of the voxel blocks during manual construction of the target object and thus fails to construct the object. In addition, the method provided in this embodiment improves the efficiency and the accuracy of the object construction.

According to the virtual-environment-based object construction apparatus provided in the foregoing embodiments, the foregoing functional modules are only used for exemplary purposes. In actual applications, the functions may be allocated to different functional modules as required, that is, the internal structure of the apparatus is divided to different functional modules to perform all or some of the foregoing functions. In addition, the virtual-environment-based object construction apparatus provided in the foregoing embodiments are based on the same concept as the virtual-environment-based object construction method in the foregoing method embodiments. For the specific implementation process, refer to the method embodiments, and the details are not described herein again.

Figure 16:
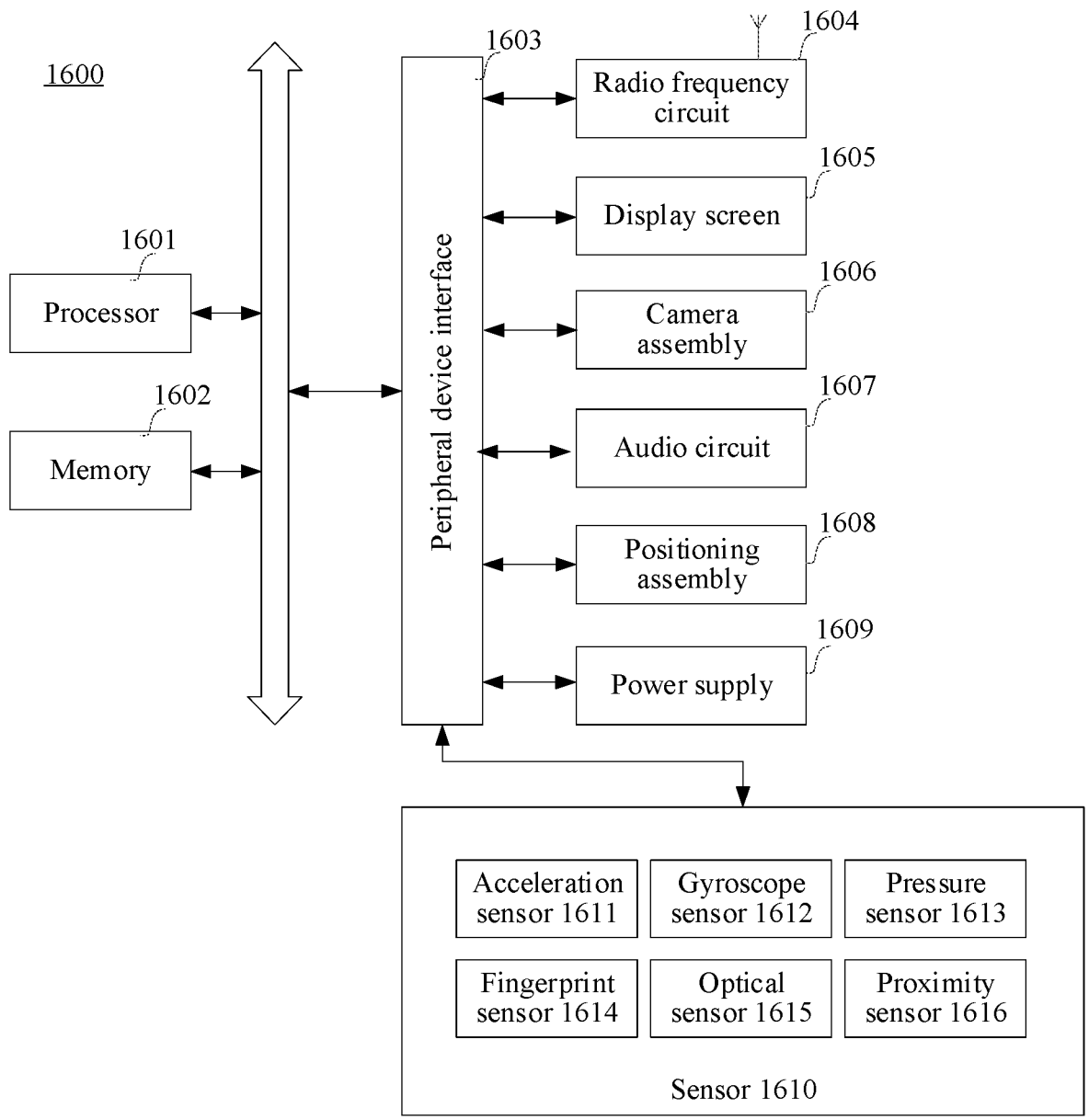
FIG. 16 is a schematic structural block diagram of a terminal according to one or more embodiments of the present disclosure.

FIG. 16 is a structural block diagram of a terminal 1600 according to an exemplary embodiment of the present disclosure. The terminal 1600 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1600 may also be referred to as a user equipment, a portable terminal, a laptop terminal, a desktop terminal or the like.

Generally, the terminal 1600 includes a processor 1601 and a memory 1602.

The processor 1601 may include one or more processing cores, and may be, for example, a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor is a processor that is configured to process data in an awake state, also referred to as a central processing unit (CPU), and the coprocessor is a low-power processor that is configured to process data in an idle state. In some embodiments, the processor 1601 may be integrated with a graphics processing unit (GPU). The GPU is configured to be responsible for rendering and drawing content to be displayed by a display screen. In some embodiments, the processor 1601 may further include an artificial intelligence (AI) processor. The AI processor is configured to process a calculation operation related to machine learning.

The memory 1602 may include one or more computer-readable storage media that may be non-transitory. The memory 1602 may further include a high-speed random access memory and a non-volatile memory, for example, one or more disk storage devices or flash memory devices. In some embodiments, the non-transient computer-readable storage medium in the memory 1602 is configured to store at least one instruction, and the at least one instruction is used for being executed by the processor 1601 to implement the virtual-environment-based object construction method provided in the method embodiments of the present disclosure.

In some embodiments, the terminal 1600 may alternatively include: a peripheral interface 1603 and at least one peripheral. The processor 1601, the memory 1602, and the peripheral interface 1603 may be connected through a bus or a signal cable. Each peripheral may be connected to the peripheral interface 1603 through a bus, a signal cable, or a circuit board. The peripheral device may include at least one of a radio frequency (RF) circuit 1604, a touch display screen 1605, a camera 1606, an audio circuit 1607, a positioning assembly 1608, and a power supply 1609.

The peripheral device interface 1603 may be configured to connect the at least one peripheral device related to input/output (I/O) to the processor 1601 and the memory 1602. In some embodiments, the processor 1601, the memory 1602, and the peripheral device interface 1603 are integrated on the same chip or circuit board. In some other embodiments, any one or two of the processor 1601, the memory 1602, and the peripheral device interface 1603 may be implemented on a separate chip or the circuit board. This is not limited in this embodiment.

The RF circuit 1604 is configured to receive and transmit a radio frequency (RF) signal, also referred to as an electromagnetic signal. The RF circuit 1604 communicates with a communication network and another communication device by using the electromagnetic signal. The RF circuit 1604 converts an electric signal into an electromagnetic signal for transmission, or converts a received electromagnetic signal into an electric signal. In certain embodiments, the radio frequency circuit 1604 includes an antenna system, an RF transceiver, one or more amplifiers, a tuner, an oscillator, a digital signal processor, a codec chip set, a subscriber identity module card, and the like. The RF circuit 1604 may communicate with another terminal by using at least one wireless communication protocol. The wireless communication protocol includes, but is not limited to, a world wide web, a metropolitan area network, an intranet, various generations of mobile communication networks (2G, 3G, 4G, and 5G), a wireless local area network and/or a wireless fidelity (Wi-Fi) network. In some embodiments, the RF circuit 1604 may further include a circuit related to a near field communication (NFC) circuit. This is not limited in the present disclosure.

The display screen 1605 is configured to display a user interface (UI). The UI may include a graph, text, an icon, a video, and any combination thereof. When the display screen 1605 is a touch display screen, the display screen 1605 is also capable of collecting a touch signal on or above a surface of the display screen 1605. The touch signal may be used as a control signal to be inputted into the processor 1601 for processing. In this case, the display screen 1605 may be further configured to provide a virtual button and/or a virtual keyboard that are/is also referred to as a soft button and/or a soft keyboard. In some embodiments, there may be one display screen 1605 disposed on a front panel of the terminal 1600. In some other embodiments, there may be at least two display screens 1605 respectively disposed on different surfaces of the terminal 1600 or designed in a foldable shape. In still some other embodiments, the display screen 1605 may be a flexible display screen disposed on a curved surface or a folded surface of the terminal 1600. The display screen 1605 may further be set to have a non-rectangular irregular graph, that is, a special-shaped screen. The display screen 1605 may be manufactured by using a material such as a liquid crystal display (LCD), an organic light-emitting diode (OLED), or the like.

The camera assembly 1606 is configured to collect an image or a video. In certain embodiments, the camera assembly 1606 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera assembly 1606 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1607 may include a microphone and a speaker. The microphone is configured to collect sound waves of a user and an environment, and convert the sound waves into electrical signals and input the electrical signals into the processor 1601 for processing, or input the electrical signals into the RF circuit 1604 to implement speech communication. For a purpose of stereo collection or noise reduction, there may be a plurality of microphones disposed at different portions of the terminal 1600 respectively. The microphone may further be an array microphone or an omni-directional collection type microphone. The speaker is configured to convert electrical signals from the processor 1601 or the RF circuit 1604 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1607 may further include an earphone jack.

The positioning assembly 1608 is configured to position a current geographic location of the terminal 1600, to implement a navigation or a location based service (LBS). The positioning assembly 1608 may be a positioning assembly based on the Global Positioning System (GPS) of the United States, the China's Beidou Navigation Satellite System (BDS), or the Galileo system of Russia.

The power supply 1609 is configured to supply power to assemblies in the terminal 1600. The power supply 1609 may be an alternating current, a direct current, a primary battery, or a rechargeable battery. When or in response to determining the power supply 1609 includes the rechargeable battery, the rechargeable battery may be a wired charging battery or a wireless charging battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect a magnitude of acceleration on three coordinate axes of a coordinate system established with the terminal 1600. For example, the acceleration sensor 1611 may be configured to detect components of gravity acceleration on the three coordinate axes. The processor 1601 may control, according to a gravity acceleration signal collected by the acceleration sensor 1611, the touch display screen 1605 to display the UI in a landscape view or a portrait view. The acceleration sensor 1611 may be further configured to collect motion data of a game or a user.

The gyroscope sensor 1612 may detect a body direction and a rotation angle of the terminal 1600. The gyroscope sensor 1612 may cooperate with the acceleration sensor 1611 to collect a 3D action by the user on the terminal 1600. The processor 1601 may implement the following functions according to the data collected by the gyroscope sensor 1612: motion sensing (such as changing the UI according to a tilt operation of the user), image stabilization at shooting, game control, and inertial navigation.

The pressure sensor 1613 may be disposed at a side frame of the terminal 1600 and/or a lower layer of the display screen 1605. When the pressure sensor 1613 is disposed at the side frame of the terminal 1600, a holding signal of the user on the terminal 1600 may be detected. The processor 1601 performs left and right hand recognition or a quick operation according to the holding signal collected by the pressure sensor 1613. When the pressure sensor 1613 is disposed on the low layer of the touch display screen 1605, the processor 1601 controls, according to a pressure operation of the user on the display screen 1605, an operable control on the UI. The operable control includes at least one of a button control, a scroll-bar control, an icon control, and a menu control.

The fingerprint sensor 1614 is configured to collect a fingerprint of a user, and the processor 1601 recognizes an identity of the user according to the fingerprint collected by the fingerprint sensor 1614, or the fingerprint sensor 1614 recognizes the identity of the user based on the collected fingerprint. When identifying that the user's identity is a trusted identity, the processor 1601 authorizes the user to perform related sensitive operations. The sensitive operations include: unlocking a screen, viewing encryption information, downloading software, paying and changing a setting, and the like. The fingerprint sensor 1614 may be disposed on a front face, a back face, or a side face of the terminal 1600. When a physical button or a vendor logo is disposed on the terminal 1600, the fingerprint sensor 1614 may be integrated together with the physical button or the vendor logo.

The optical sensor 1615 is configured to collect ambient light intensity. In an embodiment, the processor 1601 may control display brightness of the display screen 1605 according to the ambient light intensity collected by the optical sensor 1615. When the ambient light intensity is relatively high, the display luminance of the display screen 1605 is increased. When the ambient light intensity is relatively low, the display luminance of the display screen 1605 is reduced. In another embodiment, the processor 1601 may further dynamically adjust a camera parameter of the camera assembly 1606 according to the ambient light intensity collected by the optical sensor 1615.

The proximity sensor 1616, also referred to as a distance sensor, is generally disposed on the front panel of the terminal 1600. The proximity sensor 1616 is configured to collect a distance between the user and the front surface of the terminal 1600. In an embodiment, when the proximity sensor 1616 detects that the distance between the user and the front surface of the terminal 1600 gradually becomes smaller, the display screen 1605 is controlled by the processor 1601 to switch from a screen-on state to a screen-off state. When or in response to determining the proximity sensor 1616 detects that the distance between the user and the front surface of the terminal 1600 gradually becomes larger, the display screen 1605 is controlled by the processor 1601 to switch from the screen-off state to the screen-on state.

A person skilled in the art may understand that a structure shown in FIG. 16 constitutes no limitation on the terminal 1600, and the terminal may include more or fewer assemblies than those shown in the figure, or some assemblies may be combined, or a different assembly deployment may be used.

A person of ordinary skill in the art may understand that all or a part of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, and a code set or an instruction set, the at least one instruction, the at least one program, and the code set or the instruction set being loaded and executed by the processor to implement the virtual-environment-based object construction method according to any one of FIG. 3, FIG. 6, and FIG. 11.

According to another aspect, a computer device is provided. The computer device includes a processor and a memory. The memory stores at least one instruction, at least one program, a code set or an instruction set, the at least one instruction, the at least one program, the code set or the instruction set being loaded and executed by the processor to implement the virtual-environment-based object construction method according to any one of FIG. 3, FIG. 6, and FIG. 11.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to another aspect, a computer-readable storage medium is provided. The computer-readable storage medium stores at least one instruction, at least one program, and a code set or an instruction set, the at least one instruction, the at least one program, and the code set or the instruction set being loaded and executed by the processor to implement the virtual-environment-based object construction method according to any one of FIG. 3, FIG. 6, and FIG. 11.

According to another aspect, a computer program product is provided. The computer program product, when running on a computer, causes the computer to perform the virtual-environment-based object construction method according to any one of FIG. 3, FIG. 6, and FIG. 11.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists. The foregoing embodiments only describe several implementations of the present disclosure specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A virtual-environment-based object construction method, applied to a terminal or a server, the method comprising:
   displaying an environment interface corresponding to a virtual environment;
   receiving a three-dimensional (3D) model input operation for inputting a target 3D model of a target object;
   receiving a model slicing operation for performing 3D slicing on a bounding box corresponding to the target 3D model;
   receiving, on the environment interface, a position input operation for determining a display position of the target object in the virtual environment; and
   displaying the target object at the display position in the virtual environment according to the 3D model input operation and the position input operation, the target object being obtained by generating voxel blocks based on the target 3D model and the model slicing operation.

2. The method according to claim 1, wherein generating the voxel blocks based on the target 3D model comprises:
   filling with voxel blocks within a contour range of the target 3D model.

3. The method according to claim 2, wherein filling with voxel blocks within the contour range of the target 3D model comprises:
   determining the voxel blocks located on a contour of the target 3D model; and
   filling with the voxel blocks within a contour range according to the voxel blocks located on the contour of the target 3D model.

4. The method according to claim 3, wherein determining the voxel blocks located on the contour of the target 3D model comprises:
   receiving the model slicing operation to obtain a slicing mode corresponding to each dimension;
   determining voxel regions according to the model slicing operation, the voxel regions being regions obtained by performing the 3D slicing on the bounding box, the voxel regions being used for being filled with the voxel blocks;
   determining a target voxel region located on the contour of the target 3D model; and
   determining the voxel blocks filled in the target voxel region as the voxel blocks on the contour of the target 3D model.

5. The method according to claim 4, wherein receiving the model slicing operation comprises:
   receiving a slice quantity input operation, the slice quantity input operation including an operation of inputting respective slice quantities of three dimensions of the target 3D model; and performing the 3D slicing on the bounding box based on the slice quantities according to the slice quantity input operation; or
   receiving a sliding slicing operation, and performing the 3D slicing on the bounding box according to the sliding slicing operation,
   the slice quantity corresponding to each dimension being used for determining a degree of refinement of the target object generated by the target 3D model.

6. The method according to claim 4, wherein the contour of the target 3D model is formed by triangular patches; and determining the target voxel region located on the contour of the target 3D model comprises:

determining, in response to determining the voxel region intersects the triangular patch, that the voxel region is the target voxel region located on the contour of the target 3D model.

7. The method according to claim 6, wherein filling with the voxel blocks within the contour range according to the voxel blocks located on the contour of the target 3D model comprises:
scanning the voxel regions in the bounding box;
determining a relationship between a normal direction of the triangular patch and a scanning direction in response to determining the scanning proceeds to the target voxel region comprising the triangular patch, the normal direction of the triangular patch correspondingly facing to outside of the target 3D model;
filling with the voxel blocks in the scanning direction in response to determining the normal direction and the scanning direction are relatively opposite; and
stopping filling with the voxel blocks in the scanning direction in response to determining the normal direction and the scanning direction are relatively the same.

8. The method according to claim 4, wherein after determining the target voxel region located on the contour of the target 3D model, the method further comprises:
determining pixels that are on the contour of the target 3D model and that correspond to the target voxel region; and
determining, according to the pixels, a color of the voxel blocks filled in the target voxel region.

9. A virtual-environment-based object construction apparatus, comprising: at least one memory storing computer program instructions; and at least one processor coupled to the at least one memory and configured to execute the computer program instructions and perform:
displaying an environment interface corresponding to a virtual environment; and
receiving a three-dimensional (3D) model input operation for inputting a target 3D model of a target object;
receiving a model slicing operation for performing 3D slicing on a bounding box corresponding to the target 3D model;
receiving, on the environment interface, a position input operation for determining a display position of the target object in the virtual environment; and
displaying the target object at the display position in the virtual environment according to the 3D model input operation and the position input operation, the target object being obtained by generating voxel blocks based on the target 3D model and the model slicing operation.

10. The apparatus according to claim 9, wherein generating the voxel blocks based on the target 3D model comprises: filling with voxel blocks within a contour range of the target 3D model.

11. The apparatus according to claim 10, wherein filling with voxel blocks within the contour range of the target 3D model comprises:
determining the voxel blocks located on a contour of the target 3D model; and
filling with the voxel blocks within a contour range according to the voxel blocks located on the contour of the target 3D model.

12. The apparatus according to claim 11, wherein the at least one processor is configured to execute the computer program instructions and further perform:
receiving the model slicing operation to obtain a slicing mode corresponding to each dimension;
determining voxel regions according to the model slicing operation, the voxel regions being regions obtained by performing the 3D slicing on the bounding box, the voxel regions being used for being filled with the voxel blocks;
determining a target voxel region located on the contour of the target 3D model; and
determining the voxel blocks filled in the target voxel region as the voxel blocks on the contour of the target 3D model.

13. The apparatus according to claim 12, wherein the at least one processor is configured to execute the computer program instructions and further perform:
receiving a slice quantity input operation, the slice quantity input operation comprising an operation of inputting slice quantities of three dimensions of the target 3D model; and perform the 3D slicing on the bounding box based on the slice quantities according to the slice quantity input operation; or
receiving a sliding slicing operation, and perform the 3D slicing on the bounding box according to the sliding slicing operation,
the slice quantity corresponding to each dimension being used for determining a degree of refinement of the target object generated by the target 3D model.

14. The apparatus according to claim 12, wherein the contour of the target 3D model is formed by triangular patches; and the at least one processor is configured to execute the computer program instructions and further perform:
determining that the voxel region is the target voxel region located on the contour of the target 3D model in response to determining the voxel region intersects the triangular patch.

15. The apparatus according to claim 14, wherein the at least one processor is configured to execute the computer program instructions and further perform:
scanning the voxel regions in the bounding box;
determining a relationship between a normal direction and a scanning direction of the triangular patch in response to determining the scanning proceeds to the target voxel region comprising the triangular patch, the normal direction of the triangular patch correspondingly facing to outside of the target 3D model;
filling with the voxel blocks in the scanning direction in response to determining the normal direction and the scanning direction are relatively opposite; and
stopping filling with the voxel blocks in the scanning direction in response to determining the normal direction and the scanning direction are relatively the same.

16. The apparatus according to claim 12, wherein the at least one processor is configured to execute the computer program instructions and further perform:
determining pixels that are on the contour of the target 3D model and that correspond to the target voxel region; and
determining, according to the pixels, a color of the voxel blocks filled in the target voxel region.

17. A non-transitory computer-readable storage medium, storing at least one instruction, at least one program, a code set or an instruction set, the at least one instruction, the at least one program, the code set or the instruction set, when being loaded and executed by at least one processor, causes the at least one processor to perform:
displaying an environment interface corresponding to a virtual environment;

receiving a three-dimensional (3D) model input operation for inputting a target 3D model of a target object;

receiving a model slicing operation for performing 3D slicing on a bounding box corresponding to the target 3D model;

receiving, on the environment interface, a position input operation for determining a display position of the target object in the virtual environment; and displaying the target object at the display position in the virtual environment according to the 3D model input operation and the position input operation, the target object being obtained by generating voxel blocks based on the target 3D model and the model slicing operation.

18. The non-transitory computer-readable storage medium according to claim 17, wherein generating the voxel blocks based on the target 3D model comprises: filling with voxel blocks within a contour range of the target 3D model.

19. The non-transitory computer-readable storage medium according to claim 18, wherein filling with voxel blocks within the contour range of the target 3D model comprises:

determining the voxel blocks located on a contour of the target 3D model; and filling with the voxel blocks within a contour range according to the voxel blocks located on the contour of the target 3D model.

20. The non-transitory computer-readable storage medium according to claim 18, wherein determining the voxel blocks located on the contour of the target 3D model comprises:

receiving the model slicing operation to obtain a slicing mode corresponding to each dimension;

determining voxel regions according to the model slicing operation, the voxel regions being regions obtained by performing the 3D slicing on the bounding box, the voxel regions being used for being filled with the voxel blocks;

determining a target voxel region located on the contour of the target 3D model; and determining the voxel blocks filled in the target voxel region as the voxel blocks on the contour of the target 3D model.

* * * * *